United States Patent [19]

Ruckle et al.

[11] Patent Number: 4,457,948
[45] Date of Patent: Jul. 3, 1984

[54] QUENCH-CRACKED CERAMIC THERMAL BARRIER COATINGS

[75] Inventors: Duane L. Ruckle, Mesa, Ariz.; David S. Duvall, Cobalt, Conn.

[73] Assignee: United Technologies Corporation, Hartford, Conn.

[21] Appl. No.: 401,689

[22] Filed: Jul. 26, 1982

[51] Int. Cl.³ .............................................. B05D 1/08
[52] U.S. Cl. ..................................... 427/34; 427/257; 427/374.1; 427/398.3; 427/423
[58] Field of Search ...................... 427/34, 423, 374.1, 427/398.1, 398.3, 257; 428/155

[56] References Cited

U.S. PATENT DOCUMENTS

| | | | |
|---|---|---|---|
| 2,357,399 | 9/1944 | Gregory | 427/374.7 |
| 3,953,636 | 4/1976 | Kirchner | 428/155 |
| 4,055,705 | 10/1979 | Stecura et al. | 428/633 |
| 4,103,002 | 7/1978 | Hench et al. | 427/398.1 |
| 4,248,940 | 2/1981 | Goward et al. | 428/633 |
| 4,321,311 | 3/1982 | Strangman | 428/623 |
| 4,335,190 | 6/1982 | Bill et al. | 427/34 |

OTHER PUBLICATIONS

Duvall and Ruckle, "Ceramic Thermal Barrier Coatings for Turbine Engine Components", ASME Paper No. 82-GT-322, New York, N.Y., (1982).

Sumner and Ruckle, "Development of Improved Durability Plasma Sprayed Ceramic Coatings for Gas Turbine Engines", American Institute of Aeronautics and Astronautics, No. AIAA-80-1193, (1980).

Primary Examiner—John H. Newsome
Attorney, Agent, or Firm—C. G. Nessler

[57] ABSTRACT

Plasma flame sprayed ceramic thermal barrier coatings on metal substrates are treated to make the coatings resistant to damage from thermal cycling. The coating and substrate are heated to a temperature in the range of 820°–1150° C. then are quenched in a medium capable of producing a surface heat flux of at least $1.3 \times 10^5$ watts/m². This causes creation of a fine network of cracks extending from the surface of the coating to the surface of the substrate whereby during thermal cycling, buildup of damaging stresses at the coating-substrate interface is avoided.

6 Claims, 5 Drawing Figures

QUENCH-CRACKED CERAMIC THERMAL BARRIER COATINGS

DESCRIPTION

1. Technical Field

The present invention relates to plasma sprayed ceramic coatings, such as those used to thermally protect workpieces.

2. Background Art

It has long been an object to improve the resistance of metal workpieces to high heat fluxes by applying to their surfaces ceramic coatings. In gas turbine engines some superalloy parts may be subjected to very high temperatures exceeding their useful operating temperatures, if they were unprotected and uncooled. Protective ceramic coatings are of particular interest in such instances, as thermal barriers. However, although such uses have been pursued, they have also been found to be very difficult to effectively achieve.

While a ceramic coating can be applied to the surface of a metal workpiece in a variety of ways, the problem is to make the ceramic coating stay adhered to the workpiece for a prolonged period. This objective is particularly hard to achieve where the workpiece is subject to repetitive heating and cooling, such as are many components in gas turbine engines. And, of course, in a gas turbine engine where the temperatures are exceedingly high, only the more refractory ceramics can be used. Thus, various vitreous-ceramic coatings which have found common use on metals at low temperatures are not useful. Generally, only refractory ceramics having melting points in excess of 1370°-1650° C. are useful. The requirement of high temperature capability for the ceramic coating both limits the mode by which the ceramic can be applied and the choice of composition.

Refractory ceramic coatings can be applied to metal workpieces by a variety of methods; they have been applied by vapor deposition, as described in U.S. Pat. No. 4,321,310 to Ulion et al and U.S. Pat. No. 4,321,311 to Strangman, both having common ownership herewith. Probably the most favored from the standpoint of low cost and flexibility has been plasma arc spraying. In this process, ceramic powders are melted and propelled toward the workpiece, where they deposit and adhere. Usually, the workpiece has been prepared beforehand by roughening and by the applying of a metallic bond coat. See U.S. Pat. No. 4,055,705 to Stecura et al, and U.S. Pat. No. 4,248,940 to Goward et al, wherein the general manner in which ceramic thermal barrier coatings are applied is described. The publication by the applicants herein, "Ceramic Thermal Barrier Coatings for Turbine Engine Components", American Society of Mechanical Engineers Paper No. 82-GT-322, New York, N.Y. (1982) generally reviews the state of current technology. As indicated therein, zirconia is the currently favored ceramic for thermal barrier coatings because of its high refractory properties and its relatively low thermal conductivity.

The basic problem with zirconia plasma sprayed coatings is that they tend to spall from typical high thermal expansion metal workpieces during thermal cycling. It was recognized some time ago that it was an improvement to put an oxidation resistant metal bond coat layer on the workpiece. A preferred bond coat has been MCrAlY, an alloy based on Ni, Co, Fe or mixtures thereof, and containing Al and Y. The alloy remains stable even when oxygen from the environment penetrates through naturally permeable plasma sprayed zirconia layers, thus enabling the ceramic to remain well adhered. Nonetheless, there is a basic difference in thermal expansion between the ceramic coating and an MCrAlY underlayer, as well as the common nickel and cobalt superalloy workpieces. It was logically thought that the "thermal expansion mis-match" could be alleviated by providing mixed metal and ceramic transition layers, or by progressively transitioning from a metallic coating to a ceramic coating. While this procedure did accomplish its objectives of reducing spalling of a ceramic coating, it was still found that after long term high temperature exposure oxidation of the metal particles embedded within the ceramic layer causes them to increase in volume. This in turn creates destructive internal strains in the ceramic coating. Consequently, the presently preferred way of creating thermal barrier coatings is to put a substantially pure ceramic coating onto a substrate which has been prepared by first depositing an oxidation resistant MCrAlY coating.

Of course, with the pure ceramic layer on top of a metallic coated workpiece, the thermal expansion caused strain problems are recreated. Therefore, various alternative approaches have been taken to alleviate these. As described in the above referenced ASME article, one approach is to control the temperature of the workpiece carefully during the coating procedure, so that the residual stress state of the ceramic coating and workpiece provides the optimum coating life. Another approach has been to make the coating porous so that it is approximately 80-85% dense. While this procedure is effective in improving the durability of the coating, the low density of the coating also makes it more prone to particulate erosion. Also, controlled porosity in a coating is only achieved by careful process control. Thus, when the workpiece has a highly contoured or irregularly shaped surface it is difficult to obtain the same critical deposition parameters at various points on the workpiece. The net result is that the control of porosity is not fully useful for many workpieces.

The 1980 publication of the American Institute of Aeronautics and Astronautics, Number AIAA-80-1193 "Development of Improved Durability Plasma Sprayed Ceramic Coatings for Gas Turbine Engines", by Sumner and Ruckle, describes an investigation aimed at improving the durability of plasma sprayed ceramic coatings on superalloy airfoils of gas turbine engines. Among the techniques was the scanning of the surface of a 20 weight percent yttria stabilized zirconia coating with a laser beam. The laser heats the surface of the ceramic material and stresses during cooling produces localized cracking of the ceramic. The cracks are referred to as microcracks because of their small scale. The crack pattern is found to provide resistance to spalling of the ceramic during thermal cycling. See the copending U.S. patent application of Ruckle et al, Ser. No. 278,938, filed June 29, 1981 and having common assignee herewith, and the copending U.S. patent application of Wisander et al, Ser. No. 242,795, filed Mar. 11, 1981 now U.S. Pat. No. 4,377,371 (415/174).

However, to obtain good results the processing parameters must be critically controlled. A somewhat porous plasma coating and preheating of the substrate are often necessary to avoid spalling as the coating cools after the laser heating step. Also, the surface of the article must be accessible to the laser and this presents difficulties in complex shaped workpieces.

Randomly oriented microcracks have also been introduced into the ceramic coating material by choice of proper composition, such as by including 21 weight percent magnesia in a zirconia coating. During thermal treatment after plasma spraying, the coating has internal stresses which result in random microcracks. These microcracks are found to improve the resistance of the coating to thermal failure.

Vapor deposited ceramic coatings, as described in the Ulion et al U.S. Pat. No. 4,321,310, can be made with columnar type structures and they have improved thermal fatigue resistance. The ceramic coating is deposited as many individual columnar segments which are firmly bonded to the article surface but not to each other. Thus, the gaps between the columnar segments allow the metallic substrate to expand without causing damaging stresses in the ceramic. Ordinary plasma spray coatings are quite different in structure from vapor deposited coatings. They are comprised of a multiplicity of frozen and adhered droplets and do not possess the desirable strain tolerant columnar structure.

Thus, while there have been many different approaches with various degrees of success and feasibility, there is still a need for improvements in ceramic thermal barrier coatings.

DISCLOSURE OF THE INVENTION

An object of the invention is to improve the properties of plasma sprayed ceramic coatings so that they have better thermal fatigue resistance, i.e., resistance to spalling during repetitive thermal cycling. A further object of the invention is to produce a desirable microcracked structure in ceramic plasma sprayed coatings using a relatively non-critical technique which is useful with highly contoured surfaces.

According to the invention, a conventional plasma sprayed ceramic coated article is first produced. Next, the coated article is heated to an elevated temperature and quenched in a high heat transfer medium. When properly done in accord with the invention, a type of microcracking results which tends to create a columnar segmented structure.

To obtain the desired and thermal fatigue resisting structure the coated article is quenched with sufficient severity to cause the ceramic coating to contract in unit dimension faster than the adjacent hot substrate. This causes the ceramic coating to incur stresses greater than its ultimate tensile stress. As an example of the invention, a 0.25 mm thick ceramic coating, by weight 20 percent yttria and 80 percent zirconia, is sprayed over a 0.13 mm MCrAlY coating on a nickel superalloy substrate. The coated article is then heated to about 1080° C. and plunged into a bath of liquid tin at about 220° C. Experiments indicate that media and temperatures producing a surface heat flux of about $1.3 \times 10^5$ W/m² are required to produce the desired cracking in zirconia coatings 0.25-0.75 mm thick. Water and fluidized bed quenching may be used in place of liquid metal.

Microexamination of ceramic plasma coatings on articles produced using the foregoing process show that many cracks extend completely through the coating, running from the surface to the underlayer, transverse to the general plane of the coating. Thus, the plasma coating is converted by the quenching into a multiplicity of segments. In the particular example of the foregoing paragraph, the segments have an in-plane nominal dimension of about 0.1-1.2 mm.

Thermal fatigue testing shows that the coatings produced in the foregoing manner have greatly improved adherence compared to coatings which have not been quenched. Also, since the coatings are able to be made relatively dense, improved wear resistance is obtained. The invention is applicable to various ceramic materials and is particularly useful because quenching is a relatively simple and economic operation; and achievement of the desired ceramic coating structure is not easily complicated by the contours of the workpiece.

The foregoing and other objects, features and advantages of the present invention will become more apparent from the following description of preferred embodiments and accompanying drawings.

BEST MODE FOR CARRYING OUT THE INVENTION

As indicated below, the general mode of the invention is applicable to various combinations of ceramic coatings and metal substrates. The best mode of the invention is exemplified in terms of a coating which is yttria stabilized zirconia ceramic (by weight percent 20 $Y_2O_3$–80 $ZrO_2$), applied to the surface of a 13 mm diameter by 100 mm long cylindrical bar of cast MAR-M 509 cobalt base alloy (by weight percent 23.4 Cr, 10 Ni, 0.2 Ti, 0.6 C, 7 W 3.5 Ta, 0.5 Zr, balance Co). Conventional plasma arc spraying equipment and techniques are used to apply both a metallic undercoating and the ceramic thermal barrier coating. First, the bar is grit blasted to roughen the surface. Then a metallic undercoating of the MCrAlY type (where M is one or more of the metals nickel, cobalt and iron) is plasma sprayed to a thickness of about 0.013 mm. Using conventional techniques for spraying metals, the coating will have a density of about 80-95% of its theoretical density. A preferred coating composition is by weight percent 22 Co, 18 Cr, 13 Al, 0.7 Y, balance Ni.

Next the ceramic thermal barrier coating is applied, usually in a thickness of about 0.25-0.75 mm. The powder which is sprayed will have a particle size which falls in the range $5-100 \times 10^{-6}$ m, with a nominal median of about $50 \times 10^{-6}$ m. It is sprayed in air at a rate of about 0.6 g/s with the exit of the spraying torch nozzle about 80 mm from the bar workpiece; the torch is traversed back and forth along the length of the bar at about 15 mm/s. The torch gas is by volume 85% argon and 15% helium; the torch is operated at 800 amps and 50 volts, nominally 40 kw. During spraying, the substrate bar is cooled with an air blast to keep it at 40°-320° C. The ceramic coating is continually deposited until the desired thickness is obtained.

After coating, the workpiece is allowed to cool to room temperature. It is then heated to a temperature of 1080° C. in a hydrogen atmosphere for 4 hours, and then cooled. The purpose of this optional, but preferred, heat treatment is to provide improved bonding between the MCrAlY undercoat and the substrate bar; it is also probable that the bonding between the MCrAlY and the ceramic layer is enhanced somewhat. During the coating and the heat treatment cycles, the cooling rate of the workpiece is not closely controlled; it tends to be in the range of 0.5°-5° C. per second. Microexamination of the ceramic coating at this point will show it is not cracked, and it has a density of about 80-90% of the theoretical maximum density.

Figure 1:
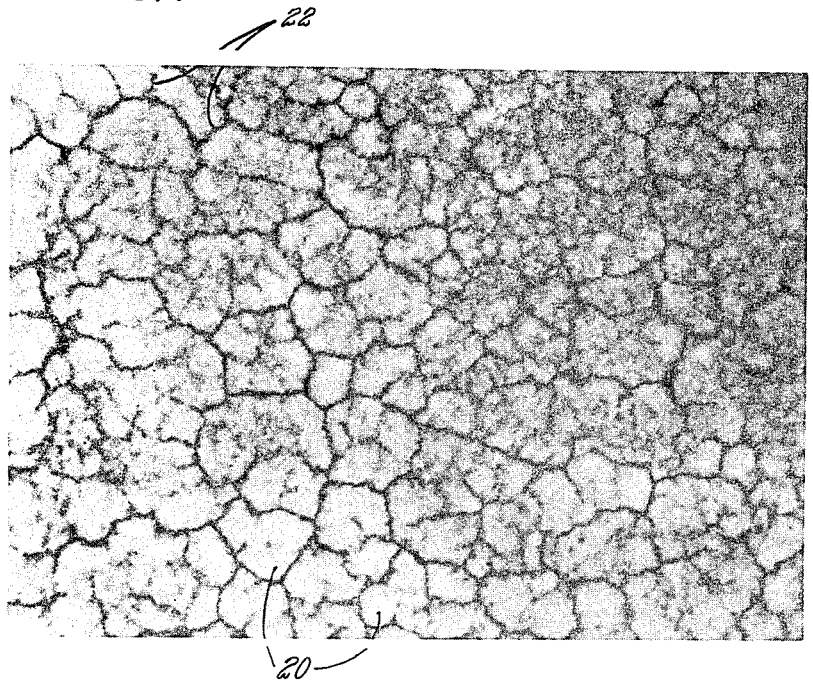
FIG. 1 shows the surface of a quench cracked ceramic coating.

The coated bar is next heated to a uniform temperature in the range of 820°-1150° C., preferably 1080° C. Then it is quenched into a bath of liquid tin metal at about 220° C. As a result of the high heat transfer rate caused by the liquid metal, the ceramic is cooled very much more rapidly than the underlying substrate. As a result, tensile stresses are created in the coating and it is caused to crack, resulting in a segmented surface appearance, as shown in FIG. 1. It is seen that an irregular pattern of cracks 22 intersects the surface, forming a multiplicity of irregular shaped segments 20. There are both small and relatively large segments, and the nominal segment diameter dimension is 0.1-1.2 mm. The dimension referred to is the diameter of an area which approximates the area of the cross section of a columnar segment, as measured at the coating exterior surface.

Figure 2:
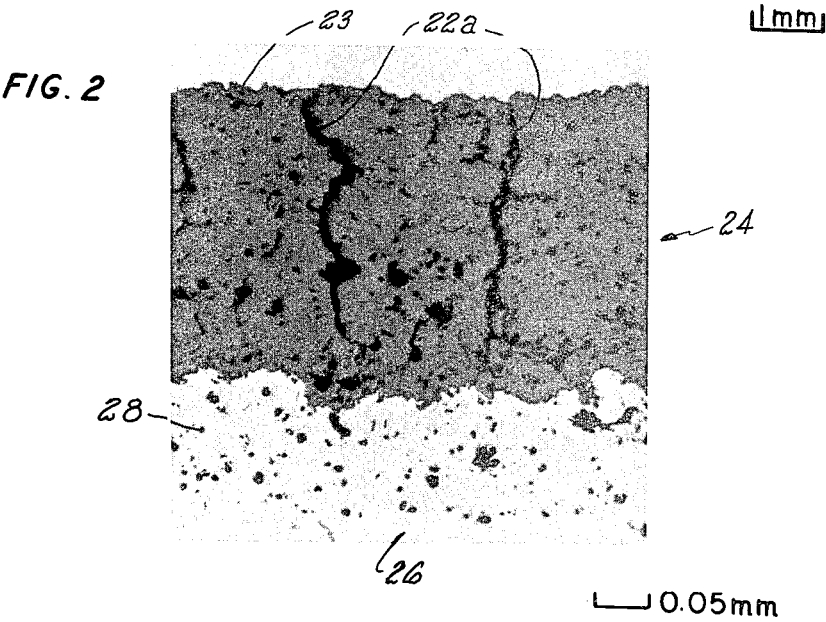
FIG. 2 is a cross section view of a coating like that shown in FIG. 1, indicating the columnar nature of the segments.

FIG. 2 shows a cross-sectional view of a quenched coating 24 on a substrate 26. It is found that many of the cracks 22a which intersect the surface 23 extend all the way through the coating 24, down to metallic interlayer 28 on the substrate 26. The columnar nature of the segments is apparent. (In FIG. 1 the crack appearance has been photogenically enhanced by applying a liquid dye to the specimen.)

Test bars which were subject to the foregoing quench cycle were compared in laboratory tests to identical test bars which had not been quenched. Microexamination of the specimens which were not quenched indicates that they do not have the microcracked and segmented structure of the quenched coatings which is shown in FIGS. 1 and 2. The specimens were tested for resistance to thermal fatigue induced spalling by cyclically heating them to 1080° C. for four minutes, and then cooling them in a 20° C. air blast for two minutes. After a number of such cycles, the failure mode of a ceramic coating will be by the ceramic spalling from the metal article surface, typically near the interface between the ceramic coating and the MCrAlY undercoat. The data, shown in Table I, indicate that the fatigue life of a 0.25 mm thick ceramic coating was more than doubled by the quenching treatment. The results were even more dramatic for the thicker 0.5 mm coating, which as is typical, had in both instances a shorter life.

Thus, the quenching feature was discovered to be very beneficial in extending thermal fatigue life, while not significantly affecting the thermal barrier properties of the ceramic coating. In the range 200°-1000° C., the average thermal expansion coefficient of yttria-zirconia is about $12.6 \times 10^{-6}$ mm/mm/°C., which is relatively high for a refractory oxide ceramic, while the thermal expansion coefficient of MAR-M-509 is about $17 \times 10^{-6}$ mm/mm/°C. The ceramic coatings which are commercially feasible and which are useful as thermal barriers will have thermal coefficients of expansion about the same or less than that for yttria-zirconia. Likewise, most nickel superalloys based on nickel, cobalt, iron or mixtures thereof, will tend to have high coefficients of expansion, greater than about $13 \times 10^{-6}$ mm/mm/°C. Generally, the thermal expansion coefficient of the substrate will be greater than that of the ceramic coating which is applied to it as a thermal barrier. The invention herein is only concerned with combinations in which the ceramic has a thermal expansion coefficient less than the thermal expansion coefficient of the substrate metal. (MCrAlY has an expansion coefficient similar to nickel superalloys; but in any case the dimensional change of the thin underlayer is essentially dictated by the more massive substrate to which it is adhered.) Of course, while the best mode of the invention and its general application are described in terms of high temperature coatings, the invention should be applicable to ceramic coatings on metals where the operating temperatures are low, but where cyclic thermal fatigue is a cause of coating failure.

TABLE 1

Behavior of 20% Yttria-80% Zirconia Coated MAR-509 Test Bars Subjected to Repeated 1080-20° C. Thermal Cycles

| Coating Thickness (mm) | Quenching Treatment | Cycles to Spalling Failure |
| --- | --- | --- |
| 0.25 | NONE | 1920 |
| 0.25 | 1100-220° C. in Liquid Tin | 4400 |
| 0.50 | NONE | 30 |
| 0.50 | 1100-220° C. in Liquid Tin | 840 |

Figure 3:
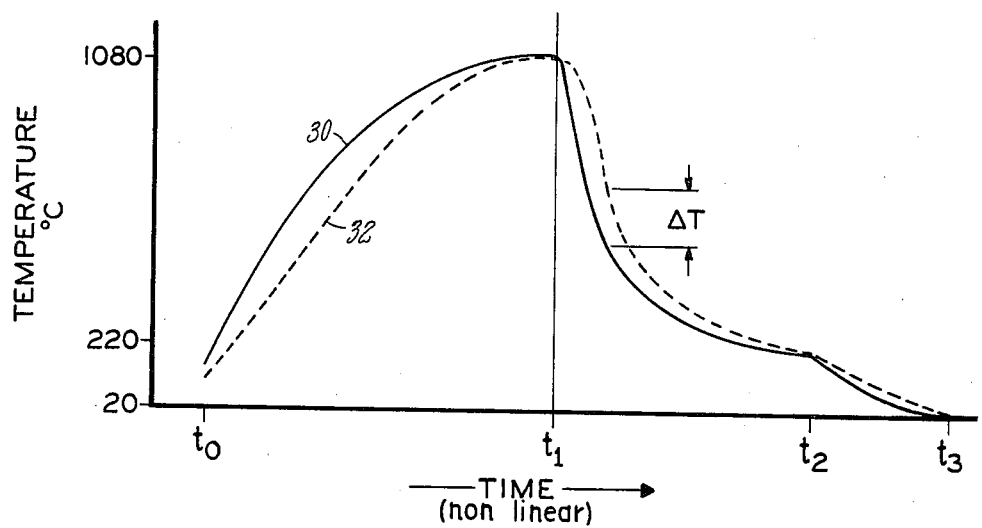
FIG. 3 is a graphical representation of the temperature cycle which an article undergoes, according to the method of the invention.
Figure 4:
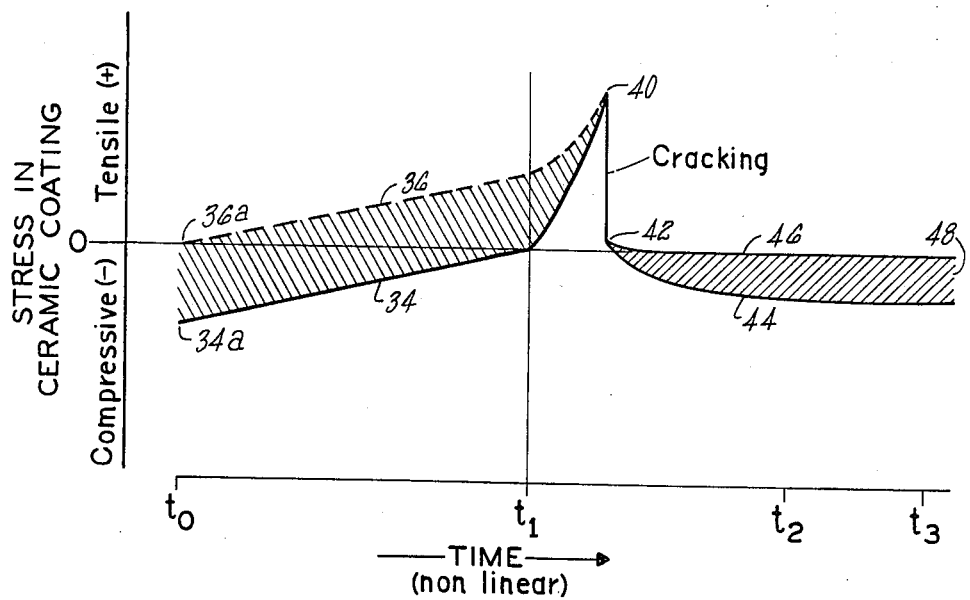
FIG. 4 corresponds with FIG. 3 and shows the stresses resulting in a ceramic coating due to the thermal cycle.

The principles of the invention can be understood by referring to FIGS. 3 and 4 which are co-aligned with respect to their time scales. FIG. 3 shows the thermal cycle to which a specimen is subjected to cause quenching and to induce the desired cracking. The curve 30 indicates the thermal history of the ceramic, while curve 32 corresponds to the temperature of the substrate metal near the surface of the substrate, adjacent the metallic underlayer coating on which the ceramic is deposited. The time scale is non-linear, and the period $t_0-t_1$ represents a long time in minutes or hours, while the period $t_1-t_2$ represents a very short time in seconds or fractions thereof. It is seen that during heating of the article, from time $t_0$ to $t_1$, the ceramic temperature leads the metal temperature, since the thermal gradient is inward, toward the center of the specimen. At time $t_1$ the coating and substrate are in equilibrium; and the specimen may optionally be held at this elevated temperature for a period of time. Then, the quenching takes place, and the ceramic coating cools very much faster than the substrate, until they again reach an equilibrium at the temperature of the quench, shown at 220° C. in the Figure. Thereafter, when the specimen is removed from the quenching medium, it cools to room temperature. This last portion of the cycle is not considered significant to the invention. The significant portion of the invention is the relative temperature difference that is created in the time period $t_1-t_2$. As shown in the Figure, a high temperature difference ($\Delta T$) is created on quenching between the relatively cold ceramic and the hot substrate. The significance of this is illustrated by FIG. 4, which represents the stress which is created in the ceramic coating due to the thermal cycle. Actual measurements have not been made of the stresses in the coating, and thus the Figure represents deduction from other evidence and analysis. In the period $t_0$-$t_1$ two curves 34 and 36 are shown. In both instances, it is seen that the stress in the ceramic coating is made more positive, or more tensile, due to the expansion of the substrate which is greater than the expansion of the ceramic coating. Whether the ceramic thermal barrier coating follows the path 34 or the path 36 or another path in the shaded area between the two curves, depends on the initial stress state of the ceramic coating. Path 34 is followed when the initial stress state is at 34a; this is characteristic of a coating which has been put on a substrate while the substrate is at elevated temperature; upon cooling after coating deposition, the greater contraction of the substrate will put the ceramic layer into compression. Alternatively, a coating at 36a with a slightly tensile stress, results when the ceramic is sprayed on a relatively cool substrate. Regardless of the initial conditions, when the ceramic coated substrate is heated to the elevated equilibrium temperature, at time $t_1$ the ceramic probably will have some tensile stress in it. However, the tensile stress will not be so great as to cause cracking, because microexamination indicates that slower cooling from such temperatures does not produce detectable cracks, within the context of the cracks normal to the surface which are caused in the practice of the invention. The aforementioned hydrogen heat treatment cycle is one example. In the quenching period $t_1$-$t_2$, since the ceramic coating is cooled so much more greatly than the underlying substrate, a very much higher tensile stress is created, rising to the tensile value indicated at point 40. The value is representative of the ultimate tensile strength of the coating at the instantaneous temperature of the coating. (As a practical matter, for most ceramics of interest, the tensile strength is fairly constant in the range 220°-1080° C.) When the tensile stress in the coating reaches a certain point 40, the coating cracks and the stresses are thereby relieved, dropping to nominally zero at point 42; continued contraction of the coating and substrate during the remainder of the time period $t_1$-$t_2$ will cause the ceramic to approximately follow a path 44, 46 or the like, with the result that at time $t_2$ when the coating and substrate are in equilibrium with the quenching medium, the coating is left with a residual stress which may be zero or slightly compressive. Removal from the hot quenching medium and further cooling down to room temperature, might slightly increase the compressive residual stress further, so that it ends up at time $t_3$ at point 48 or some stress state thereabouts.

Accordingly, in order to obtain beneficial cracking, it is necessary that the coating layer be cooled sufficiently fast, at an average rate greater than 100° C./second, so that the ceramic coating contracts more in unit dimension than does the adjacent metal substrate. It is this which forms the segmented coating structure. Such segments are understood to be beneficial as are columns in U.S. Pat. Nos. 4,321,310 and 4,321,311, mentioned in the background, the teachings of which are hereby incorporated by reference.

Data show that identical test pieces produced by the method of the present invention have better ceramic adherence during thermal cycling than articles having had the ceramic surface quenched by laser heating, as described in the background. Of course, in the laser heating method it is only the very surface of the ceramic coating which is melted or heated and which is quenched by rapid cooling of the adjacent ceramic material and radiation. Whether cracks in the laser heating invention prevalently extend from the surface to the substrate, entirely through the ceramic coating, is very dependent on the exact amount of surface heating and melting. It is thus a difficult process to control, and the laser-scanned coatings can be prone to unexpected spalling. In the present invention, a greater number of cracks (about 50-80% compared to 30-50% for laser heated coatings) extend entirely through the ceramic coating. These better stop the propagation of any local spalling failure along the undercoat surface. Another difference that has been observed is that in our invention, the segments tend to be 0.1-1.2 mm, and predominantly 0.4-1.2 mm in planar dimension (as viewed in FIG. 1), whereas plasma coatings which have been laser quenched tend to have smaller segments, generally less than 0.25 mm in dimension. Smaller columns are considered more advantageous from a thermal fatigue stand point, and therefore the distinct nature of our crack pattern over the prior art is emphasized. For the yttria-zirconia coating and similar predominantly zirconia coatings, we have found the invention useful with coatings between 0.12-1.0 mm thick. To obtain the desired results we have found that when using liquid tin at 220° C., we heated the 0.25 mm ceramic coated article to about 1080° C.; that is, the quenching temperature difference was about 860° C. We have not defined all the details of our invention; but higher initial temperatures, in excess of 1080° C. will of course be useful as well, provided the temperature is not so high as to itself damage the article. For thicker coatings, lower temperature differences down to 600° C. appear useful.

As indicated, thermal barrier ceramics will have coefficients of thermal expansion less than the coefficients of thermal expansions of common superalloys. Accordingly, there is a tendency for the ceramic coating to change less in dimension than the typical metal substrate, when they are subject to the same temperature change. Consequently, it is necessary that a high heat transfer medium be used, to create the situation described above, so the temperature of the thin ceramic layer is substantially less than the temperature of the metal and the differential-contraction-caused tensile cracking stress is reached. As mentioned, liquid tin is sufficient for the purpose. Tests show that water will produce the requisite results.

Figure 5:
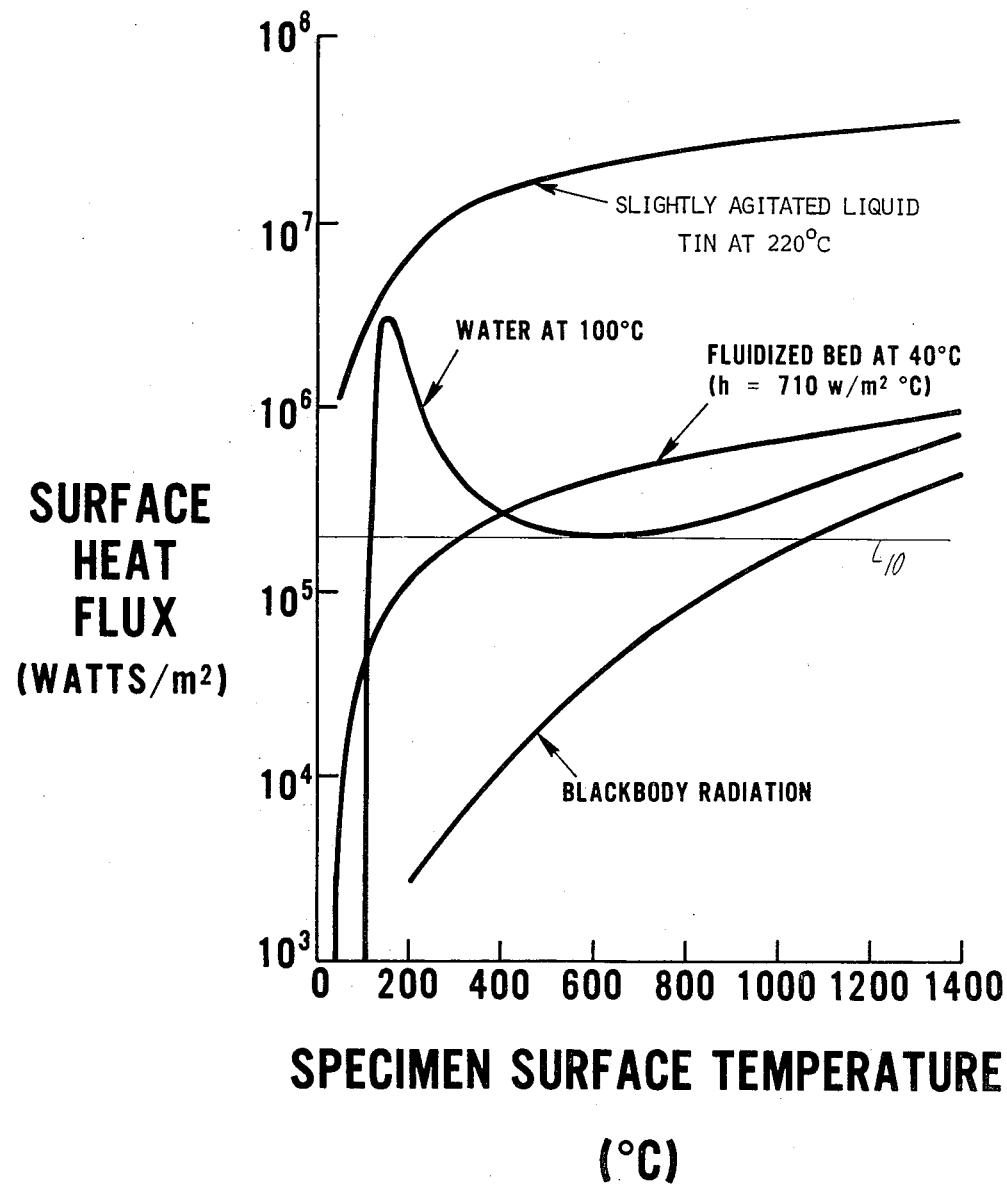
FIG. 5 is a graphical representation of heat fluxes produced by certain quenching media.

FIG. 5 shows the surface heat flux, q, of some representative quenchants. Of course the heat transfer coefficient, h, is nominally q/T where T is the instantaneous (abscissa) temperature. As previously indicated cooling an article only by radiation is not sufficient to produce the crack pattern. FIG. 5 shows the surface heat flux for a blackbody. The actual radiant heat flux for a ceramic will be somewhat lower than shown, depending on the emissivity of the particular ceramic. Most refractory ceramics of present interest tend to have high emissivities, of the order of 0.9, at temperatures over 600° C. In FIG. 5 it is seen that water, at the temperatures of 600°-1000° C. provide a heat flux of about $1.3 \times 10^3$ W/m² or greater. This is contrasted with the lower heat flux for radiation. It thus can be concluded from related experience that quenching media other than liquid tin and water will work as well, provided they provide a surface heat flux of at least $1.3 \times 10^5$ W/m² in the range 200°-1000° C., as indicated in FIG. 5 by the region lying above the line 10. For example, liquid lead at 260° C., Dow Corning 705 silicone oil at 20° C., and a fluidized sand bed at 20° C., will be satisfactory. In contrast our experiments show that contacting the surface of a 550°

C. specimen with a relatively volatile liquid media, such as a 20° C. ethanol saturated pad (as taught in U.S. patent application Ser. No. 242,795, filed Mar. 11, 1981 by Wisander et al.) does not produce the requisite crack pattern. Apparently, the initial temperature, the temperature difference, and cooling effect of volatile ethanol as applied are insufficient to cool the ceramic layer fast enough. That the Wisander et al technique does not work on the products we are concerned with can be understood when it is appreciated that Wisander et al are concerned with ceramic seals which are relatively thick (~6-8 mm) compared to thermal barrier coatings. To crack them the differential expansion is caused within the ceramic, as opposed to our invention where it is between the ceramic and the substrate. We have not been yet able to perform all the requisite experiments to definitely define which quenchants are useful and which are not. However, our analysis and the data in FIG. 5 make us believe that the surface heat transfer coefficient h at the ceramic must be in excess of about 500 watts/m$^{2°}$ C. This can, of course, be obtained by many combinations of media and movement of the media past the workpiece.

In our invention, the ceramic coating is relatively thin, as this is the nature of the thermal barrier coating useful in turbomachinery. Our invention is useful for ceramic coated gas turbine blades and vanes where thick coatings are undesired for structural and aerodynamic reasons. These types of coated articles are to be contrasted with the ceramic seal articles described in the aforementioned Wisander et al application, where the thickness of the ceramic layer is usually of the order of 3-7 mm thick.

Our invention does not provide the same benefit for all ceramic coatings. For example, 21% by weight magnesia-zirconia coated bars, prepared in the same manner as indicated for yttria-zirconia above, show little difference in thermal fatigue resistance between a quenched article and the non-quenched article. As indicated in the 1982 publication by the applicants referred to in the background, a 21% magnesia-zirconia coating is found to contain excess magnesia; this produces a natural microcracking in the coating, due to differences in thermal expansions between free magnesia and the zirconia base matrix, as they occur during normal manufacture or heat treatment. Since the coating is already cracked by a different mechanism, the quenching procedure we described does not result in the creation of the desired tensile stresses. Our invention will only be applicable to thin ceramic coatings in which there is no inherent crack pattern running transverse to the substrate. Such coatings will comprise the most common refractory oxide coatings (i.e., those having melting points greater than about 1600° C.) based on zirconia, alumina, silica, mixtures thereof, and the like.

Plasma spraying is currently in favor because of the ease of application and relatively low cost of coatings. However, our invention will be applicable to other coatings deposited by other procedures where the coatings are essentially monolithic in the same sense as are plasma coatings.

Zirconia is a preferred base for high temperature applications. It is preferably stabilized in cubic form by the use of amounts of calcium oxide, magnesium oxide, yttrium oxide, as are known in the art, and as are taught by the below-mentioned Goward et al patent. We have applied our invention to zirconia coatings having different quantities and types of stabilizers; we presently feel that the best material is 6% yttria-zirconia. This material seems to be somewhat stronger than the 20% yttria-zirconia on which the bulk of our developmental work for the invention was performed.

For the refractory oxide coatings and high temperature applications with which we have been most concerned, the MCrAlY underlayer is very desirable, as taught by the U.S. Pat. No. 4,248,980 to Goward et al. Various MCrAlY alloys may be used, as described in U.S. Pat. Nos. 3,542,530, 3,676,085, 3,754,903 and 3,928,026, the disclosures of which are incorporated by this reference. Of course, other underlayers such as nichrome, molybedenum, nickel aluminide and the like will be useful. And in other instances the underlayer may be dispensed with entirely, as is commonly known.

As should be evident from our discussion, from the standpoint of the invention when a metallic underlayer is present it is functionally treated as part of the metal substrate. When we refer to a superalloy substrate we mean a high temperature corrosion resistant alloy based on iron, nickel or cobalt, as are well known as useful in aircraft engines.

Although this invention has been shown and described with respect to a preferred embodiment, it will be understood by those skilled in the art that various changes in form and detail thereof may be made without departing from the spirit and scope of the claimed invention.

We claim:

1. The method of improving the resistance to thermal fatigue failure of a thin ceramic coating adhered to the surface of a metal substrate article, wherein the ceramic material has a lower coefficient of thermal expansion than the metal and wherein the failure is by spalling of the ceramic coating characterized by heating both the coating and substrate to an elevated first temperature; and then contacting the ceramic coating surface with a heat transfer medium at a second temperature lower than the first temperature, to quench the coating so that the coating contracts in unit dimension faster than the adjacent substrate, to cause a thermal stress in the coating which exceeds its ultimate tensile stress, to thereby create in the coating a multiplicity of cracks running from the coating surface to the surface of the metal article and create within the coating a multiplicity of cracks running from the surface of the metal substrate to the surface of the ceramic coating.

2. The method of claim 1 wherein the coating is a refractory ceramic oxide and the metal substrate is a superalloy; characterized by heating the article to a uniform first temperature at least 600° C. greater than the second temperature and cooling the coating and substrate at a rate greater than 5° C./second.

3. The method of claim 1 wherein the coating is a 0.12-1.0 mm thick ceramic, characterized by contacting the ceramic coating surface with a heat transfer medium producing a surface heat flux of at least $1.3 \times 10^5$ watts/m$^2$.

4. The method of claim 1 wherein the coating is a plasma sprayed ceramic having a melting point greater than 1400° C. and a thermal expansion coefficient of less than $13 \times 10^{-6}$/°C., wherein the substrate is a superalloy having a thermal expansion coefficient greater than $13 \times 10^{-6}$/°C., characterized by heating the coating and substrate to a temperature of at least 800° C., and quenching the coating by contacting it with a heat transfer medium which provides a heat transfer coefficient of at least about 500 watts/m$^2$/°C. at the ceramic surface.

5. The method of claims 1, 2, 3 or 4 characterized by quenching the article in a liquid metal at a temperature less than 250° C.

6. The method of claim 4 wherein the ceramic portion of the coating is comprised predominantly of zirconia.

* * * * *